Sept. 6, 1966 J. DOLZA 3,270,724
SPLIT ENGINE WITH TURBOCHARGER
Filed July 19, 1963 4 Sheets-Sheet 1

INVENTOR.
John Dolza
BY
Barnard, McGlynn & Reising
ATTORNEYS

Sept. 6, 1966 J. DOLZA 3,270,724
SPLIT ENGINE WITH TURBOCHARGER
Filed July 19, 1963 4 Sheets-Sheet 3

INVENTOR.
John Dolza
BY
Barnard, McGlynn & Leising
ATTORNEYS

United States Patent Office 3,270,724
Patented Sept. 6, 1966

3,270,724
SPLIT ENGINE WITH TURBOCHARGER
John Dolza, Fenton, Mich., assignor to Fiat S.p.A., Turin, Italy, a corporation of Italy
Filed July 19, 1963, Ser. No. 296,211
7 Claims. (Cl. 123—59)

The present invention relates to a new and improved internal combustion engine of the type adapted to produce power with all or one half of its cylinders. In addition to reducing vehicle exhaust pollution of the atmosphere and improving fuel economy, the subject invention is also adapted to facilitate engine braking during split engine operation. The invention is also readily combinable with a turbocharger in such a way as to insure a rapid transition from low to high power output.

It is known that an internal combustion engine is least efficient and correspondingly discharges into the atmosphere the greatest quantity of pollutants when the engine is operating under conditions of no or low power output. The reason for this wasteful and harmful emission of unburned fuel components is traceable to the fact that each cylinder combustion chamber is functioning so inefficiently as to not properly support combustion at a level compatible with relatively complete combustion of the fuel being supplied to the chamber.

In the present invention, it is recognized that if under coasting, idling, or light load operation only some of the cylinders are kept active to maintain the engine operative while the remainder are inactivated, then more efficient engine operation is realized accompanied by more complete combustion of the fuel and less emission of unburned combustibles to the atmosphere.

To practice the subject invention, it is necessary that the engine be split relative to the supplying of a combustible mixture to the engine's cylinders. This split operation may be achieved by providing two independent carbureting systems each applying one half of the engine cylinders, or by providing a single carburetion system which may include a valve control mechanism for distributing a combustible mixture to some or all of the engine's cylinders.

The present split engine mechanism includes what may be termed "active" and "inactive" cylinders. Under normal or high speed operation both the inactive and active cylinder groups are functioning to produce power for the engine. On the other hand, under conditions where split engine operation is both desirable and feasible, e.g., light load idling and coasting, only the active cylinders are functioning to produce power. Under these conditions, the remaining or inactive cylinders are merely "floating" in the system neither creating nor absorbing power. In this way the active cylinders are functioning efficiently to consume substantially all of the fuel supplied thereto and, consequently, emitting greatly reduced quantities of unburned combustibles as compared with current engines. Such unburned combustible emission being at a level equal to or below the standard set by statute in many states.

An important aspect of the present invention is the provision of a valve device in the exhaust system through which exhaust manifold back pressure is controlled in a manner to provide improved oxidation of exhaust gases as well as to facilitate engine braking.

It is a further object of the present invention to uniquely combine a turbocharger with a split type engine and particularly in a unique manner which maintains the turbocharger at a reasonably high speed under all operating conditions and to thereby insure rapid power responses.

The details, as well as further objects and advantages, of the present invention will be apparent upon a perusal of the detailed description which follows as well as by reference to the accompanying drawings.

Figure 1:
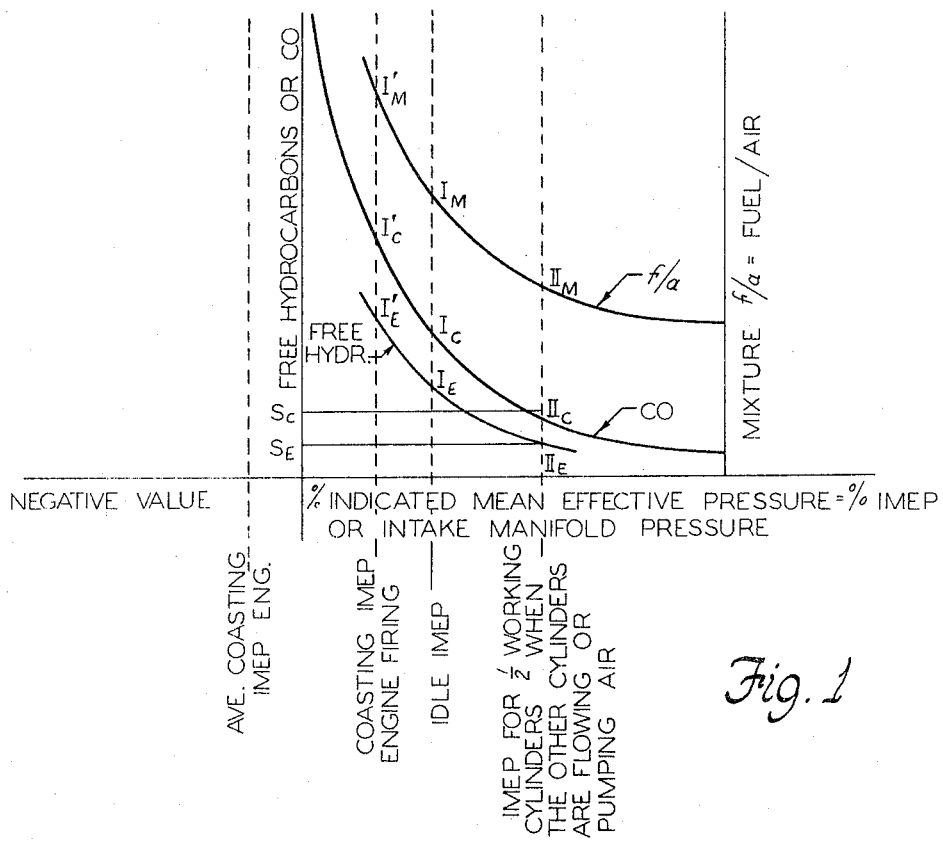
FIGURE 1 is a graphic representation of the emission problem created by inefficient engine operation as well as the improvement effected by the present invention.

It has been observed by test work on automotive-type engines that by increasing the percent of work generated by a cylinder, or the percent of Indicated Mean Effective Pressure (hereinafter called IMEP) from engine idle (or coasting condition) to approximately thirty percent of wide open throttle, IMEP, the content of CO and hydrocarbons all decrease as may be seen in referring to FIGURE 1.

In fact, while an engine is coasting the IMEP is at its lowest value, being negative when no firing takes place and positive only when intermittent firing occurs. It is to be understood that coasting is the condition in which the engine throttle is closed while the car is traveling with the engine still coupled to the drive shaft and in which condition the momentum of the car keeps the engine running at speeds greater than idle.

When the throttle of an engine is closed immediately after wide open throttle operation, the intake manifold may be coated to a very great extent with liquid gasoline leaving the manifold walls actually covered with a large number of fuel droplets. The closing of the throttle reduces the air pressure facilitating the evaporation of the liquid fuel and, because of the velocity that the fuel particles have in the direction of the previous air flow in the manifold, some of these drops keep moving into the engine's cylinders. The resultant fuel-air mixture flowing into at least some of the cylinders will be too rich to ignite during some of the initial coasting periods. Gradually the mixture will lean down to approximately idle strength $I'_m$, as seen in FIGURE 1. However, firing may still be intermittent since the amount of fuel-air mixture entering the cylinder may be too little due to dilution by the residual exhaust in the combustion chamber to support combustion. This missing or failure of the cylinder to fire will act as a scavenging cycle so that the following suction stroke will add sufficient mixture to the cylinder to permit the firing to take place. For this reason, again referring to FIGURE 1, coasting is shown as taking place with: (a) negative torque and negative IMEP and very high hydrocarbons since fuel may not burn when the engine is not firing, and (b) a low positive percent IMEP, usually lower than engine idle because the amount of charge per cylinder may be less than at idle, at the same time, there is high hydrocarbon and CO emission since the fuel-air ratios introduced into the cylinder is richer than stoichiometric (that combination of fuel and air to achieve complete combustion).

At idle, the IMEP is high enough to balance the internal and external frictions of the power plant. If the idle is properly set, firing takes place every time the mixture is ignited at the end of the compression stroke, but combustion is not completed because the mixture necessary for consistent firing is above the stoichiometric value. The result is that CO and hydrocarbons are present in the exhaust of the engine and are thus discharged into the atmosphere in quantities above that deemed to be tolerable particularly in city environments.

Again referring to FIGURE 1, the vertical line marked idle IMEP consequently intersects both the mixture $f/a$ line, free hydrocarbon and CO line at fairly high points of the curve indicated respectively by $I_m$, $I_2$, and $I_c$.

Figure 4:
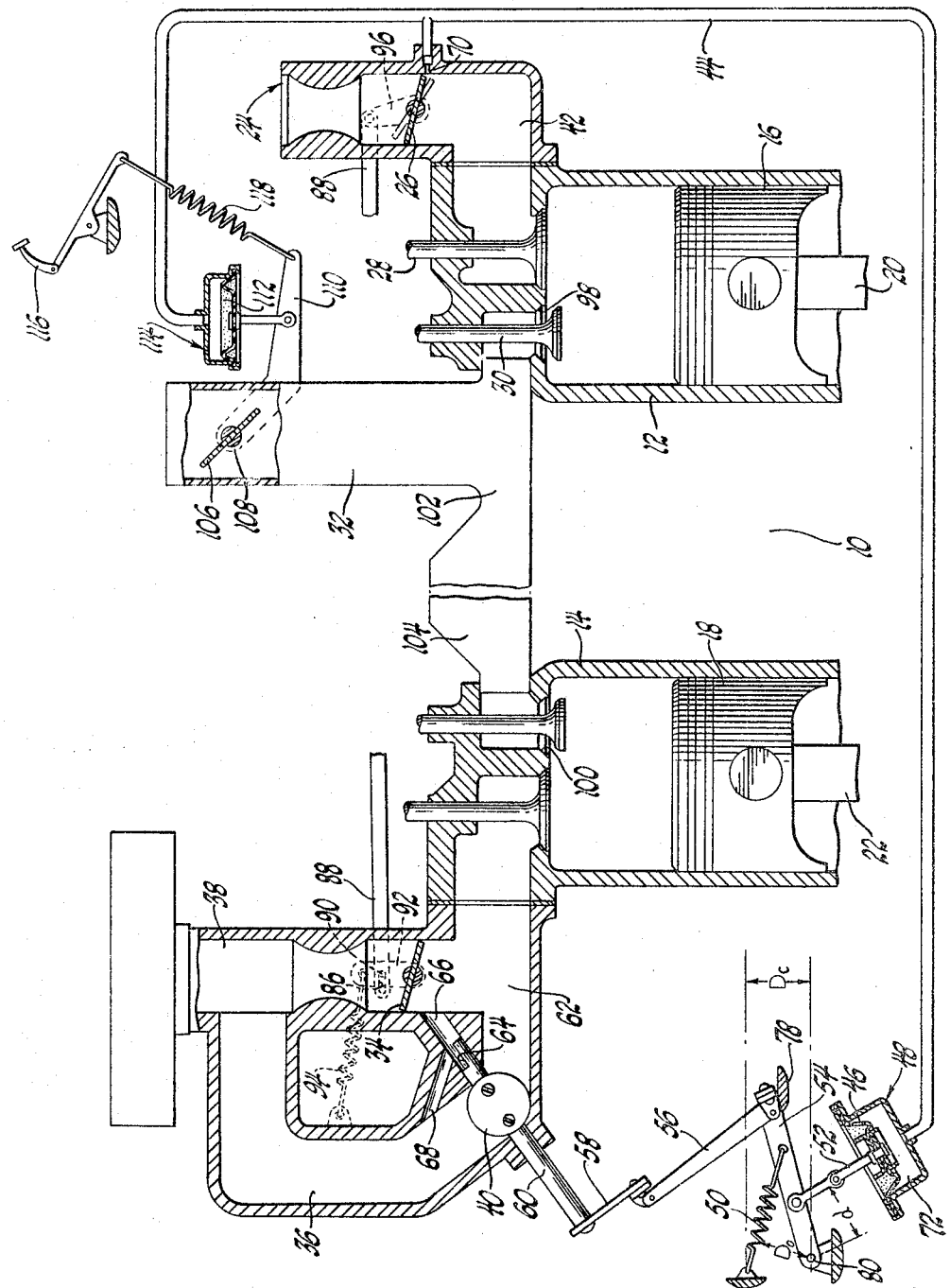
FIGURE 4 is a diagrammatic representation of an engine embodying the subject invention.

The next vertical line to the right of "idle" is designated "IMEP of one-half of the cylinders working when the other half are flowing or pumping air." This type of operation is best understood by referring to the schematic representation of FIGURE 4. In this case, an engine is indicated generally at 10 and includes an active cylinder 12 and an inactive cylinder 14, pistons 16 and 18 of which are suitably articulated through connecting rods 20 and 22 to a common crankshaft, not shown. Active cylinder 12 is supplied with a fuel-air mixture through a carburetor device indicated generally at 24 which includes a throttle valve 26. The combustible mixture is admitted to the combustion chamber of cylinder 12 through inlet valve 28 where it is ignited by a spark plug after which the combusted materials are exhausted through exhaust valve 30 and exhaust passage 32. Generally the same components are provided for the inactive cylinder 14.

In the right hand side of the engine, active cylinder piston 16 is pumping a combustible mixture through carburetor 24 whose throttle 26 is set to idle high enough so that it may generate sufficient power to drag the right hand or inactive piston 18 and perform a substantially adiabatic compression in drawing a full charge of air, compressing it and permitting it to expand. Thus the left hand cylinder 18 acts as intermittent energy storing system since during the compression stroke it draws energy from the firing cylinder and returns it during the expansion stroke.

The diagram of FIGURE 1 shows that because of this higher percent IMEP required from the firing cylinders, the $f/a$ point $II_M$, the hydrocarbon point $II_E$ and the CO point $II_C$ are considerably lower than the corresponding values $I_M$, $I_E$ and $I_C$ at engine idling when all of the cylinders are firing.

When an engine idles with some of its cylinders pumping air without the very large depression caused by the throttle associated therewith, it has to overcome considerably less pumping loss. Thus, the mount of work performed by the firing cylinders to keep the engine idling is less than when all of the cylinders are firing at idle. When half the cylinders are firing they work at higher thermal and combustion efficiencies which increases engine economy and drastically reduces the emission of unburned hydrocarbons and CO. In other words, the net result is that an engine idling on half of the cylinders and pumping unrestricted air with the remaining cylinders uses considerably less fuel than the engine idling by firing all cylinders.

If we use the following symbols:

$W_{1/2}$ = weight of air consumed by the firing cylinders when engine is idling with ½ of the cylinders $W_A$ = weight of air consumed by the engine when idling by firing all cylinders $W_{1/2} < W_A$ $W_{1/2}/W_A$ is approximately equal to .7

Consequently, the ratio:

(A) $$\frac{II_E \times W_{1/2}}{I_E \times W_A} < \frac{II_E}{I_E}$$

and (B) $$\frac{II_C W_{1/2}}{I_C W_A} < \frac{II_C}{I_C}$$

Since:

$II_E \times W_{1/2}$ is the weight of hydrocarbon with ½ of cylinders firing and ½ of cylinders pumping $II_C \times W_{1/2}$ weight of CO with half of cylinders firing and half of cylinders pumping $I_E \times W_A$ weight of hydrocarbons on conventional idle $I_C \times W_A$ weight of CO on conventional idle Equations (A) and (B) state that the overall weight of hydrocarbons and CO exhausted by an engine with only ½ of its cylinders firing at idle or off idle is less than the reduction one would expect from the percent of hydrocarbons and CO in the exhaust of the operating portion of the engine.

In FIGURE 1, the percent of CO presently allowed by those cities or states having anti-pollution laws is indicated with $S_C$, and a horizontal line at that value shows that a conventional engine when coasting generates a percent of CO indicated by $I'_C$ and at idle at percent indicated by $I_C$ where $$I'_C > I_C > S_C$$

Similarly the percent of hydrocarbons coasting $I'_E$ and idling $I_E$ are related to the amount $S_E$ allowed by statute by the expression $$I'_E > I_E > S_E$$

Test results show that the percent of hydrocarbons $II_E$ at the exhaust of the operating half of the engine can be controlled to approximately the permissible value $S_E$. Furthermore, the percent of CO indicated by $II_C$ is less than $S_C$. Consequently, by idling an engine with ½ of the cylinders firing and ½ of the cylinders pumping unrestricted air, it is possible to reduce the percent of CO and hydrocarbons to acceptable values as set by the existing laws, e.g., Los Angeles, on automotive exhaust pollution control and to reduce the weight of pollutant exhausted per hour $W_{1/2} \times II_E$ and $W_{1/2} \times II_C$ below the corresponding values $W_A \times S_E$ and $W_A \times S_C$ of an engine firing at all cylinders and having the allowed percent of hydrocarbons $S_E$ and carbon monoxide $S_C$.

The engine operation with ½ of the cylinders may be continued until the remaining cylinders must be activated to achieve power in excess of that generatable with split engine operation.

Split engine operation is achieved by dividing the engine into two groups of cylinders. One group of cylinders will operate continuously under all operational conditions while the other group of cylinders will operate only under relatively high power load operating conditions. This division of operation is obtained by having means capable of supplying separate combustion charges to the respective groups of cylinders. If twin or duplex carburetors are used, the split operation consists of blocking one carburetion system at idle and deceleration while allowing fresh air to bypass this carburetion system and to circulate through the intake manifold of this cylinder group while the other carburetion system is in normal lean mixture operation. Split engine operation is governed by throttle position and the engine manifold vacuum of the continuously operating cylinder group.

Again referring to FIGURE 4, the diagrammatic system is shown in which the carburetor parts are in the position assumed during idle and decelerating conditions. The right side depicts the carburetion system of the cylinders which are "active" under all conditions, and the left side depicts the carburetion system for the cylinders which are "inactive" during idle and deceleration conditions.

The butterfly type throttle valve 26 is adjusted for idle and thus will be partially open, while throttle valve 34 of the inactive cylinders will be completely closed. An air passage 36 is adapted to bypass normal induction passage 38 but is blocked by valve 40 under high output conditions. Valve 40 is held closed by spring 50. At idle and deceleration there will be a high vacuum in the intake manifold 42. This high vacuum is transmitted through vacuum line 44 to diaphragm 46 of servo device 48 and holds the closing valve spring 50 in an extended position. A rod 52 connects diaphragm 46 to a lever 54 which, in turn, through levers 56 and 58 is attached to shaft 60 causing valve 40 to be fully opened. Air thereby flows through air passage 36 into the intake manifold 62 thus relieving the vacuum and hence, preventing fuel from being drawn into intake manifold. Shaft 60 is provided with slot 64, which interconnects idle fuel chamber 66 with atmospheric pressure passage 68, thus insuring complete elimination of suction at the carburetor idle jets.

Figure 2:
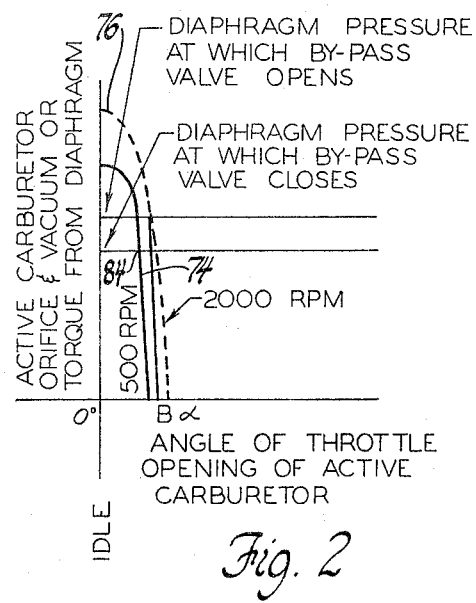
FIGURES 2 and 3 represent graphs showing the manner in which the combustible mixture diverting valve is controlled.

As throttle 26 is opened, its lip passes orifice 70, thus decreasing the vacuum under diaphragm 46. FIGURE 2 is a diagram having for the abscissa the angular throttle opening of the active carburetor, zero degrees being idle. The ordinate represents vacuum at servo chamber 72. Curve 74 represents the reduction of vacuum because of opening throttle 26 and the lip passing by orifice 70 thus letting the vacuum drop very rapidly in function of throttle opening. Curve 74 is shown for engine running at 500 r.p.m. Curve 76 for engine running at 2000 r.p.m. In FIGURE 4 lever 54 is shown pulled against stop 78 by the vacuum diaphragm 46. Rod 52 has a lever arm $d$ from pivot point 80.

If the effective area of the diaphragm is A, and the vacuum V, the torque T applied at shaft 60 is:

$$T = AVd$$

Consequently, curves 74 and 76 of FIGURE 2 can be used to represent the torque caused by the vacuum. Similar curves can be visualized at any engine speeds.

Figure 3:
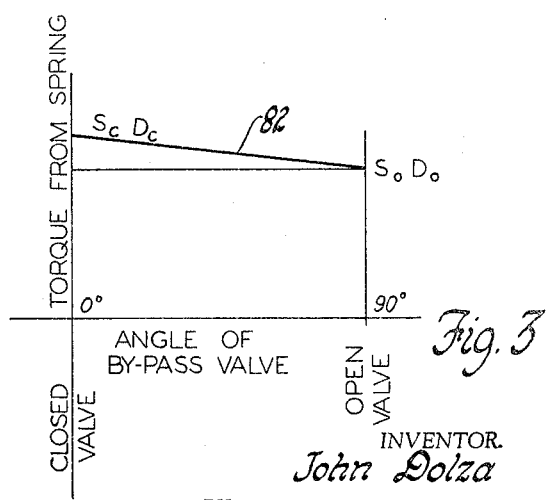

In FIGURE 3 the abscissa represents the angle of bypass valve 40 assuming 0° at closed valve and 90° at open valve; the ordinate represents the torque applied on shaft 60 by spring 50. If spring 50 has a tension $S_o$ and lever arm $D_o$ when valve 40 is open, the torque of the spring on shaft 19 will be represented by $S_oD_o$ at the angle of 90°. As lever 58 rotates toward 0°, lever arm of spring 50 increases from $D_o$ to $D_c$ at a higher rate than the reduction of spring tension from $S_o$ to $S_c$, thus:

$$S_cD_c > S_oD_o$$

Accordingly, the ordinate of curve 82 increases as the valve 40 closes.

When throttle 26 is progressively opened, torque from diaphragm 46, for example of curve 74, will drop to a value below 84, thus letting spring 50 snap valve 40 and passage closed. Thus, the bypassed carburetor becomes activated. Throttle 34 will be open when slot 86 of throttle interconnecting link 88 picks up pin 90 of lever 92 of throttle 34 by overcoming a spring 94 holding throttle 34 closed to the equivalent of a fast idle. This occurs at an angle of throttle 26 not smaller than the greatest angle $m$ at which the valve 40 closes. Angle $m$ of throttle 26 corresponds to a low speed car operation and low engine torque.

Effective lever arm of lever 92 is shorter than lever arm of 96, thus permitting throttles 26 and 34 to reach wide open positions simultaneously.

As throttle 26 closes, its lip will re-establish vacuum at orifice 70, thus increasing torque from diaphragm 46 to a value in excess to $S_cD_c$, thus restoring the left carburetor to the bypass operation. Bypass is thus achieved between throttle angle at idle or coasting up to moderate car speed.

Referring again to FIGURE 4, it is desirable to flow the exhaust air of the air pumping cylinders 18 past the exhaust ports 98 of the firing cylinder 12 by properly interconnecting the exhaust ports 98 and 100 through passage 102.

During deceleration, the rate of combustion is slow to the extent that flaming exhaust may develop when it encounters air. Since it is important that the flame may not be chilled and extinguished, it is desirable to have the exhaust air discharge in the vicinity of the exhaust port. In fact, since the air passage 102 is normally an exhaust passage, it will preheat the air before mixing with the exhaust from port 98.

Preheating may be emphasized by arranging a heat-absorbing member 104, which absorbs heat during the power operation of cylinder 18 at which time hot exhaust gases are discharged from port 100 and releases such heat during deceleration or idle to the air from the same cylinder prior to mixing with the exhaust from the active cylinders.

Figure 7:
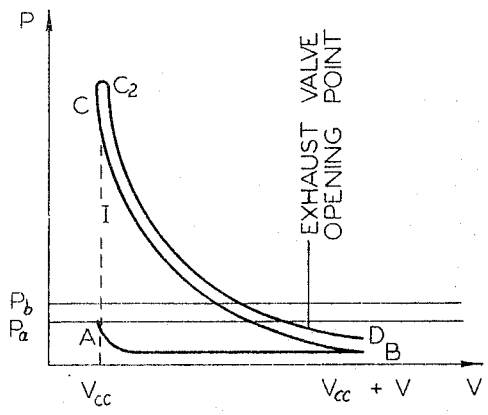
FIGURES 7, 8 and 9 are P–V diagrams indicating the conditions controlling actuation of the exhaust back pressure valve.

FIGURE 7 shows the pressure (P)-volume (V) diagram of an engine while coasting. Line $P_a$ represents the atmospheric pressure in absolute value. Line V (which is also the abscissa axis) represents cylinder volume. Line P (the ordinate axis) represents absolute pressure. $V_{cc}$ represents the volume of the combustion chamber.

The intake stroke will start at pressure A close to atmospheric because of residual exhaust in the combustion pressure, which in coasting may be less than one-third atmospheric. At B the volume is equal to the sum of the combustion chamber volume, $V_{cc}$, and cylinder volume, V. The gas is then compressed to I, at which point ignition takes place. Compression and combustion will occur simultaneously between I and C, C being the pressure at $V_{cc}$.

If ignition is sufficiently advanced, $C_2$ may be at its maximum; and the expansion curve $C_2$ may end at a pressure D not far from atmospheric and often below the air pressure from the air exhaust cylinders and delivered in the vicinity of the coasting cylinders. The air pressure, in fact, may be increased by interposing a restricting valve 106 pivoted at 108. Valve 106 is actuated by lever 110 secured to diaphragm 112 of servo device 114, which is responsive to the vacuum in the active manifold to which it is communicated through passage 44 and orifice 70.

Referring to FIGURE 7, assuming that the air back pressure is $P_b$, then air may flow back through the exhaust valve port 98 from the exhaust valve opening point to the bottom dead center of the cylinder piston 16. In this way the fresh air pumped into the exhaust system by pumping cylinders 18 will mix with and oxidize the exhaust gases further diminishing the discharge of unburned hydrocarbons into the atmosphere.

Valve 106 can be used also as an engine brake device and to increase the compressed air temperature within the exhaust operating cylinders when air enters through the exhaust manifold to facilitate the oxidation of the exhaust of the operating cylinders when air enters through the exhaust valves at approximately the end of the expansion stroke.

Figure 8:
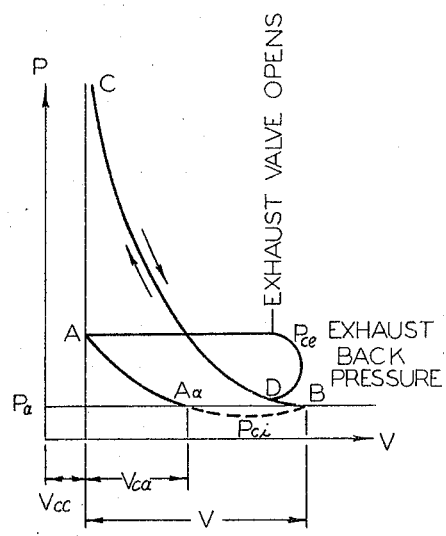

The approximate determination of the temperature rise can be arrived at by observing the P.V. diagram of the compressor cylinders as indicated in FIGURE 8. Area $AA_aBDA$ represents negative work equivalent to a throttling loss which generates a temperature rise of the air going through that cycle. If $P_{ce}$ is the exhaust back pressure, $P_{ci}$ the intake pressure, V the cylinder swept volume, then the approximate work per cycle equals $$K(P_{ce} - P_{ci})V$$

where K is a factor between .5 and .75 approximately for illustration purposes $K=.6$.

The amount of air entering the compressor cylinder per cycle is represented by the swept volume, after the initial $V_{cc}$ volume of air in the combustion chamber at pressure $P_{ce}$ has expanded to approximately atmospheric pressure $P_a$ at $V_{ca}$ $$\frac{V_{cc}+V_{ca}{}^n}{V_{cc}} = \frac{P_{ce}}{P_a}$$

for moderate value it can be approximated to:

$$\frac{V_{cc}+V_{ca}}{V_{cc}} = \frac{P_{ce}}{P_a}$$

$$V - V_{ca} = V - V_{cc}\frac{P_{ce}}{P_a} - 1$$

The actual air entering the cylinder will also depend from the volumetric efficiency $E_v$.

$$.70 < E_v < .85$$

and for a simplified calculation can be assumed $$E_v = .85$$

Consequently, the weight of air entering the compressor cylinder, if $\rho$ is the specific weight of air which may be assumed .076 #/cu. ft. for preliminary computation $$\rho E_v = .076 \times .85 = .065$$

The coefficient of retained energy $E_e$ of the compressed air because of cooling caused by the cylinder walls and the heating from the exhaust manifold make it very difficult to estimate accurately for $$\frac{P_{ce}}{P_a} < 4$$

it is assumed to be $$E_e = .85$$

Then the $\Delta T_C$ temperature rise caused by the compressor cylinders is:

$$\Delta T = \frac{.6 \times .85 V (P_{ce}-P_{ci})}{.24 \times 778 \times .065 \left[ V - V_{cc}\left(\frac{P_{ce}}{P_a}-1\right) \right]}$$

$$= .042 \frac{P_{ce}-P_{ci}}{1 - \frac{1}{R-1}\left(\frac{P_{ce}}{P_a}-1\right)}$$

where R is the compression ratio of the engine. assuming $$P_{co} = 144 \times 60$$
$$P_{ci} = 144 \times 14$$
$$\frac{P_{ce}}{P_a} = 4.3$$
$$R = 8$$
$$\Delta T = \frac{.042 \times 144 \times 46}{1 \times .525} = 575° \text{ F.}$$

Figure 9:
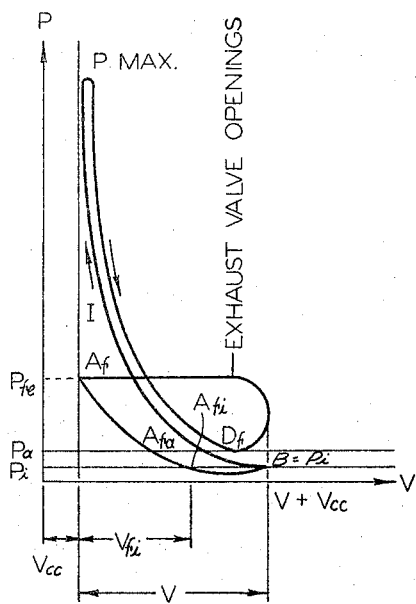

In a similar way in FIGURE 9 the beginning of the intake of the firing cylinder is represented by $A_f$ at a pressure $P_{fe}$ approximately equal to $P_{ce}$ since it originated from exhausting in the common exhaust manifold of the compressor. The residual gas must then expand into the intake manifold mixed to some extent with the carbureted mixture as the intake valve opens. Then it will re-enter the cylinder with some of the carbureted mixture.

For the purpose of figuring the amount of carbureted mixture entering the firing cylinder at each cycle, it is close enough to assume that the fresh charge may enter the cylinder from point $A_{fi}$ at which the cylinder has reached intake manifold pressure $P_i$ and that curve $A_f$, $A_{fa}$, $A_{fi}$ is given by equations approximately $$V_{cc}+V_{fi} = \frac{V_{cc}P_{ie}}{P_i}$$

for one numerical example $P_i = \frac{1}{2}P_a = \frac{1}{2}$ atmospheric pressure.

The residual exhaust in the cylinder will get mixed with the incoming charge from the manifold during the movement of the piston from $A_{fi}$ to B or from volume $$V_{cc}+V_{fi} \text{ to } V_{cc}+V$$

The charge entering will be approximately:

$$\rho E_v (V-V_{fi}) P_i / P_a$$

which must be equal to or greater than the minimum charge capable of firing.

Again referring to FIGURE 4, when engine braking is desired, the exhaust back pressure may be increased by interconnecting lever 110 with the vehicle brake pedal 116 through a spring 118 so as to produce an exhaust back pressure proportional to brake application.

Figure 5:
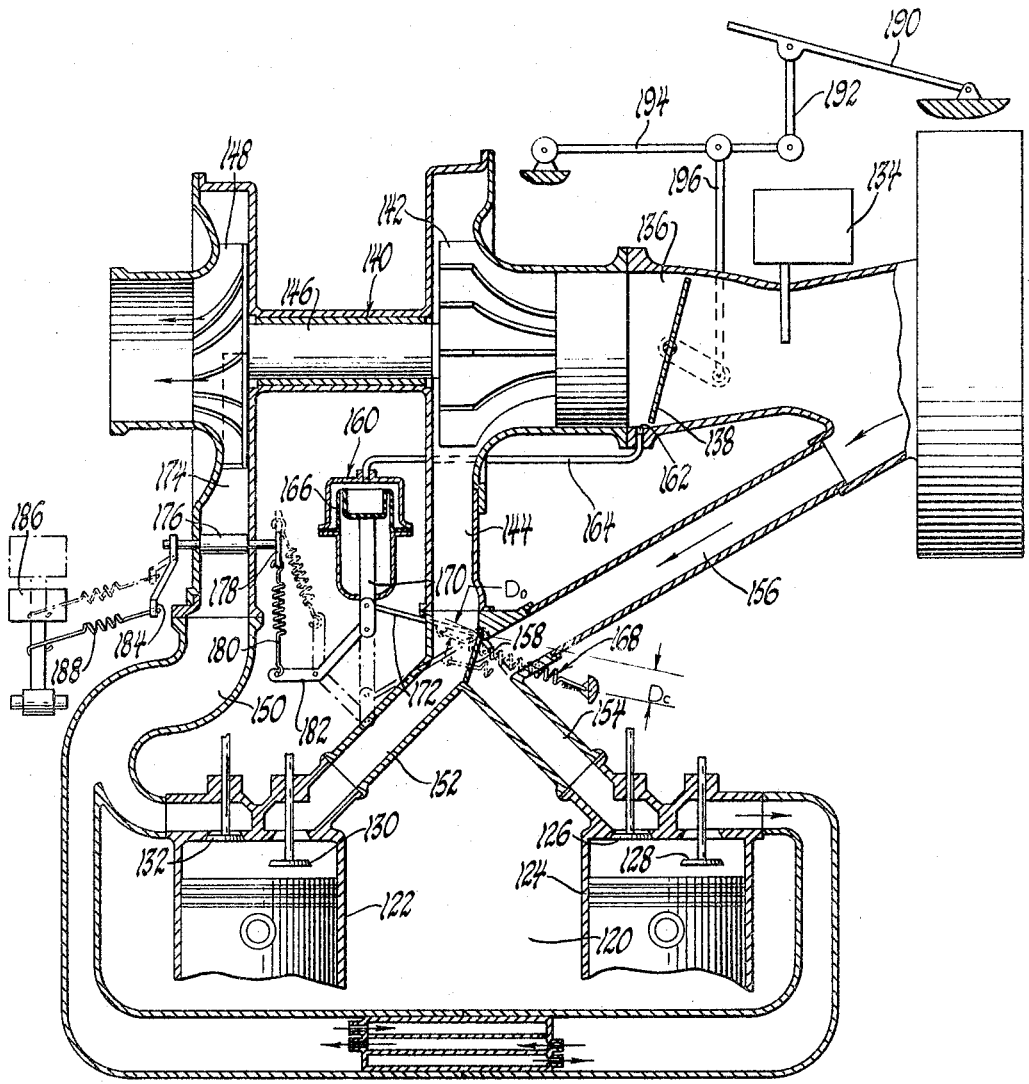
FIGURE 5 is a diagrammatic representation of the present invention combined with a turbocharger.
Figure 6:
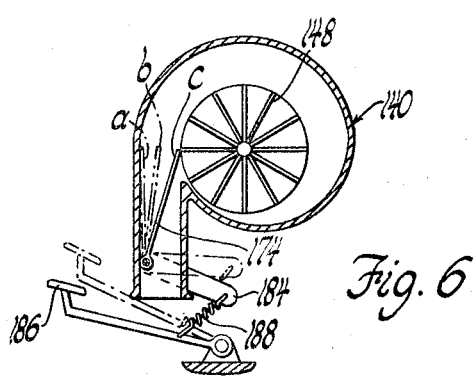
FIGURE 6 illustrates the relationship between the turbocharger turbine and the exhaust gas velocity controlling valve.
Figure 10:
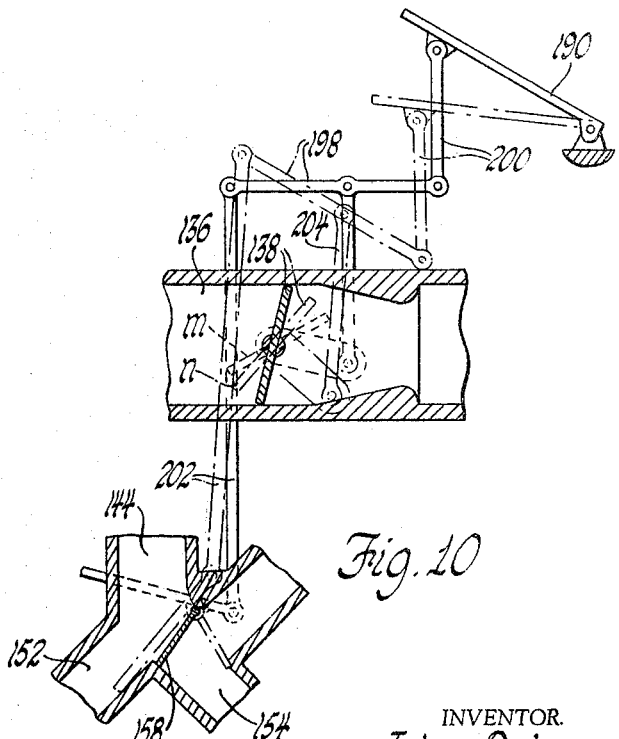
FIGURE 10 indicates a mechanism for automatically adjusting throttle position during the transition from split to full engine operation.

It is common practice to combine a supercharger with small or low powered engines. Referring now to FIGURES 5, 6, and 10, the subject split system has been uniquely combined with a turbocharger to provide a highly versatile internal combustion engine. Such an engine is capable of very economical operation, reduced unburned hydrocarbon emission, excellent engine braking, and rapid supercharger power response.

One of the traditional problems with turbosupercharged engines has been the lack of a rapid response to a demand for power after low engine speed or low power operation. In the present invention, a unique system has been devised for maintaining the turbocharger operating at a relatively high speed under all operating conditions whereby the time elapse to a demand for power is greatly diminished relative to any known engines of this general type.

Referring to FIGURE 5, an engine is indicated generally at 120 and includes active and inactive cylinders 122 and 124, respectively, having inlet and exhaust valves 126–128 and 130 and 132.

While dual carburetion systems, i.e., one for each of the "active" and "inactive" cylinders, may be used, the present modification utilizes a single carburetor device diagrammatically indicated at 134, which supplies fuel to induction passage 136. Flow of the combustible mixture through passage 136 is controlled by a single throttle valve 138.

A turbocharger is indicated generally at 140 and includes a compressor 142 disposed in induction passage 136, intermediate throttle 138, and intake manifold 144. Compressor 142 is coupled by shaft 146 to turbine 148 disposed in exhaust passage 150.

Intake manifold 144 has branch passages 152 and 154, respectively, adapted to supply a combustible charge to the active and inactive cylinders 122 and 124. A further passage 156 bypasses induction passage 136 and is adapted to supply air only to inactive cylinders 124 under certain operation conditions.

A distribution valve 158 is disposed at the junction of passages 154 and 156 and is controlled by a device 160. Device 160 is adapted to shift the valve between a first position, shown in dotted lines, blocking air bypass 156 and admitting the combustible charge to both passages 152 and 154. This is the position of valve 158 under all except low load, e.g., idling, coasting, etc., conditions.

Under such low load conditions, throttle 138 is substantially closed whereby port 162 is open to manifold vacuum, which is conveyed through conduit 164 to device 160. The manifold vacuum acts upon diaphragm 166 against the force of spring 168 and, through linkage 170–172, articulated between the diaphragm and valve 158, moves the latter to the position indicated in FIGURE 5. In this position valve 158 blocks flow of combustible mixture to passage 154 and instead communicates the latter with air bypass 156. In the low load condition, only active cylinders 122 produce power while inactive cylinders 124 pump air through the exhaust system, supra.

Since turbocharger 140 is connected to a normal Otto cycle engine, it would normally slow down whenever throttle 138 is closed since the quantity of exhaust gas would be reduced; and, therefore, the energy necessary to maintain high turbocharger speed would also be reduced. Accordingly, when immediate maximum power is desirable, the opening of the throttle provides only a mixture at approximately atmospheric pressure to the engine's cylinders. It is evident, therefore, that a period of time $x$ is necessary during accleration from atmospheric to supercharged power and that this period is equal to the period of acceleration of the compressor 142.

However, in the present invention when the engine operates with throttle 138 partially open, distributing or diverter valve 158 introduces a free flow of air to inactive cylinders 124 which pump such air to produce exhaust air flow sufficient to maintain turbine 148 and compressor 142 operating at a relatively high speed. In fact, when decelerating and braking the vehicle, exhaust pressure control valve 174 is partially closed, which, in effect, reduces the nozzle area to the turbine thereby increasing exhaust gas velocity and consequent kinetic energy of the exhaust whereby the compressor is maintained at a high speed. The split engine will, therefore, have a time interval $y$ for acceleration of the compressor 142 which is much shorter than the time interval $x$ required by a compressor associated with an engine operating on a normal Otto cycle.

Exhaust back pressure control valve 174 is fixed to a rotatable shaft 176, which is also articulated to device 160 through lever 178, spring 180, and pivoted lever 182. Valve 174 is unbalanced such that under normal operating conditions exhaust gas flow will maintain the valve in an open position "$a$," as seen in FIGURE 6. However, under low load conditions device 160 is actuated by manifold vacuum, supra, to pivot lever 182, which increases the force of spring 180 and thereby moves valve 174 to a partially closed position "$b$," as indicated in FIGURE 6.

The operation of this new system may, therefore, be described as follows: when greater engine power is required, throttle 138 is opened thereby cutting off port 162 from manifold vacuum and admitting substantially atmospheric pressure to conduit 164 whereby spring 168 of the vacuum diaphragm device 160, through levers 170–172, will shift diverter valve 158 in a counterclockwise direction to block the flow of air through passage 156 while admitting a combustible mixture to cylinders 122 and 124.

If it is desirable to provide greatly enhanced engine braking, then a lever 184 also fixed to shaft 176 may be interconnected to the vehicle brake system pedal 186 by a spring 188. Actuation of pedal 186 will supplement the force of spring 180 and move exhaust pressure control valve 174 to the position "$c$," as best seen in FIGURE 6. By thus further restricting exhaust passage 150, exhaust back pressure is greatly increased which, in turn, increases the compressive force against which the pistons of cylinders 122 and 124 work during deceleration. In this manner, highly effective engine braking is achieved under conditions of split engine operation at the same time greatly diminishing the emission of unburned hydrocarbons.

It is thus apparent that exhaust gas back pressure, and accordingly engine braking, as well as turbine speed, are controlled by the position of valve 174, which is, in turn, responsive to throttle and brake actuation.

By properly selecting the distance between vacuum port 162 and the edge of throttle valve 138 in its closed position and controlling the force of spring 168 of the vacuum servo device 160, the shift from split engine operation to total or full engine operation may be predetermined for any desired engine torque.

The shifting between split and full engine operation approximately doubles the engine output torque. Consequently, if the torque at the shift point is fairly high, an objectionable and sudden increase of torque may occur beyond the needs and to the discomfort of the driver. This may be overcome by providing a differential linkage mechanism between accelerator pedal 190 and throttle valve 138, which causes the throttle valve to be moved to a relatively more closed position when the shift from split to full engine operation occurs. Such a mechanism is shown diagrammatically in FIGURE 10. In this figure, the accelerator pedal 190 when moved from the idle or low power position, shown in full line, to the dotted line position indicating approximately full active engine 122, operation, the throttle controlling linkage would normally move the throttle valve 138 to a relatively open position "$m$," indicated in dotted line. Such transition from split to full engine operation would normally occur with a decided jolt or bump to the operator. However, to prevent this undesired effect, actuation of throttle 138 is coordinated with that of diverter valve 158. In this modification, instead of transmitting accelerator movement through the fixed lever system 192–194–196 of FIGURE 5, the differential lever system of FIGURE 10 is utilized. In this case a floating or differential lever 198 is articulated at its ends respectively to accelerator rod 200 and diverter valve controlled rod 202. Lever 198 is connected intermediate its ends to throttle rod 204. Thus, when throttle 190 is depressed sufficiently to cause device 160 to shift valve 158 from the split engine operation position shown in FIGURE 10 to the full engine operation position, dotted lines, rod 202 is shifted upwardly lifting the left end of lever 198 and thereby moving throttle valve 138 to a partially closed position "$n$." In this manner, engine torque output is diminished, making the transition from split to full engine operation smoother and more comfortable.

It is apparent that further modifications may be made in the present invention within the intended scope of the hereinafter appended claims.

I claim:
1. An internal combustion engine comprising first and second sets of cylinders, first passage means for supplying a combustible mixture to all of said cylinders under high engine output conditions and for supplying only air to said second set of cylinders under low engine output conditions whereby in said latter instance only said first set of cylinders is operative to supply power, common exhaust passage means for both sets of cylinders, a turbocharger including a compressor disposed in said first passage means and a turbine disposed in said exhaust passage means, and a valve in said exhaust passage anteriorly of said turbine for controlling the energy of the gases impinging upon said turbine.
2. An internal combustion engine as set forth in claim 1 in which said valve is also disposed to control exhaust gas back pressure.
3. An internal combustion engine as set forth in claim 1 which includes a device for moving said valve to a partially closed position during said low engine output conditions.
4. An internal combustion engine as set forth in claim 1 which includes means for moving said valve to a partially closed position to facilitate engine braking.
5. An internal combustion engine as set forth in claim 4 which includes a device for moving said valve to a partially closed position independently of said engine braking means and when only said first set of cylinders is supplying engine power.

6. An internal combustion engine comprising first and second sets of cylinders, first passage means for supplying a combustible mixture to all of said cylinders under high engine output conditions and for supplying only air to said second set of cylinders under low engine output conditions whereby in said latter instance only said first set of cylinders is operative to supply power, common exhaust passage means for both sets of cylinders, a turbocharger including a compressor disposed in said first passage means and a turbine disposed in said exhaust passage means, a first valve in said first passage means and being movable to a first position under high engine output conditions to direct the combustible mixture to all of said cylinders and a second position to direct said mixture to only said first set of cylinders under low power output conditions, a second valve in said exhaust passage anteriorly of said turbine for controlling the flow of gases therethrough, and a first device for controlling both said first valve and said second valve.

7. An internal combustion engine as set forth in claim 6 which includes a second device for controlling said second valve independently of said first device for facilitating engine braking.

References Cited by the Examiner

UNITED STATES PATENTS

| | | | |
|---|---|---|---|
| 1,413,418 | 4/1922 | Moss | 123—97 |
| 2,124,081 | 7/1938 | Rauen et al. | 123—97 |
| 2,166,968 | 7/1939 | Rohlin | 123—102 X |
| 3,116,725 | 1/1964 | Hadley | 123—97 |

FOREIGN PATENTS 781,992  8/1957  Great Britain.

MARK NEWMAN, *Primary Examiner.*

W. E. BURNS, *Assistant Examiner.*